(12) United States Patent
Kolpasky et al.

(10) Patent No.: US 6,997,279 B2
(45) Date of Patent: Feb. 14, 2006

(54) ADJUSTABLE SEAT WITH LOCK-OUT FEATURE

(75) Inventors: Kevin G. Kolpasky, Sterling Heights, MI (US); Tracey A. Wilt, Ray Township, MI (US); Albert H. Butlin, Beverly Hills, MI (US); Michael C. Gill, Grand Blanc, MI (US); David Furness, New Baltimore, MI (US); Alfred Smith, Rochester, MI (US)

(73) Assignee: General Motors Corporation, Detroit, MI (US)

( * ) Notice: Subject to any disclaimer, the term of this patent is extended or adjusted under 35 U.S.C. 154(b) by 259 days.

(21) Appl. No.: 10/427,690

(22) Filed: Apr. 30, 2003

(65) Prior Publication Data

US 2004/0216941 A1   Nov. 4, 2004

(51) Int. Cl.
  *B60R 25/00* (2006.01)
  *B60R 21/00* (2006.01)
  *B60D 1/28* (2006.01)
  *B60K 28/00* (2006.01)
  *B60L 3/00* (2006.01)

(52) U.S. Cl. .................................. 180/287; 180/271
(58) Field of Classification Search ............... 180/271, 180/287; 307/10.1, 10.2, 10.3, 10.6
See application file for complete search history.

(56) References Cited

U.S. PATENT DOCUMENTS

| | | | | |
|---|---|---|---|---|
| 4,480,713 A | * | 11/1984 | Macht et al. | 180/271 |
| 5,311,962 A | | 5/1994 | Nakano et al. | 180/271 |
| 5,449,957 A | * | 9/1995 | Carlo | 180/287 |
| 5,481,078 A | | 1/1996 | Asche | 200/85 A |
| 5,695,247 A | * | 12/1997 | Premji | 297/341 |
| 5,768,724 A | | 6/1998 | Buell | 5/118 |
| 5,951,084 A | | 9/1999 | Okazaki et al. | 296/37.16 |
| 6,240,352 B1 | | 5/2001 | McCurdy | 701/45 |
| 6,264,261 B1 | | 7/2001 | Krafcik | 296/37.8 |
| 2003/0137397 A1 | * | 7/2003 | Daniels | 340/5.7 |

* cited by examiner

*Primary Examiner*—Paul N. Dickson
*Assistant Examiner*—Joselynn Y. Sliteris
(74) *Attorney, Agent, or Firm*—Laura C. Hargitt

(57) ABSTRACT

A vehicle includes a seat adjustable fore and aft and a lock-out feature configured to render the vehicle inoperable when the seat is rearward of a predetermined point in the vehicle. The lock-out feature is preferably configured to prevent movement of the seat rearward of the predetermined point when at least one predetermined vehicle condition exists. A corresponding method is also provided.

17 Claims, 2 Drawing Sheets

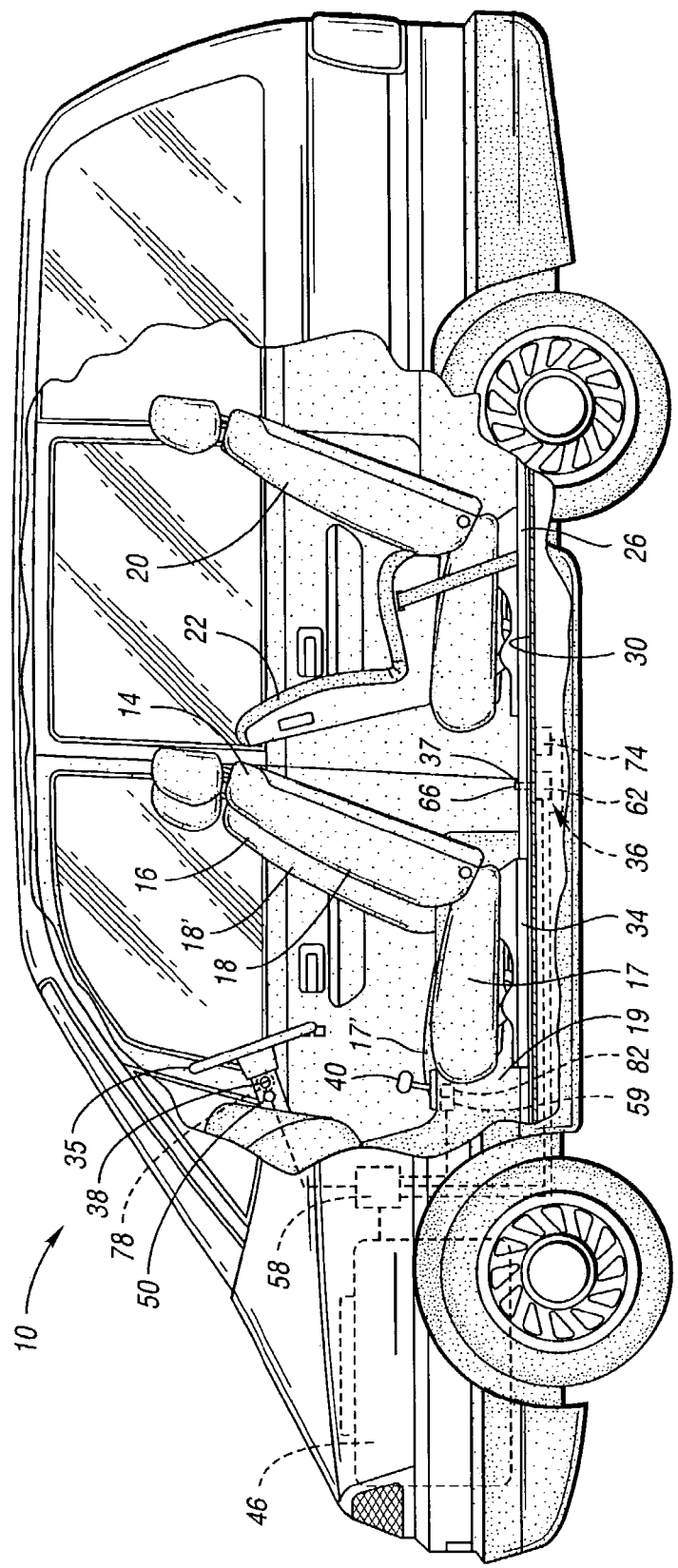
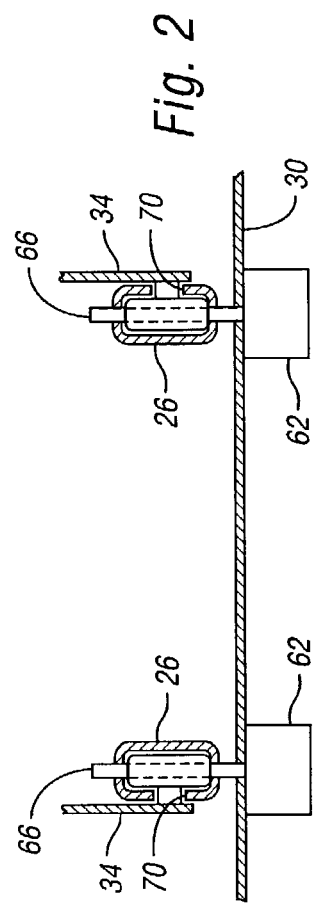

ADJUSTABLE SEAT WITH LOCK-OUT FEATURE

TECHNICAL FIELD

This invention relates to vehicles having a seat that is adjustable fore/aft and a vehicle-disabling lock-out mechanism to render the vehicle inoperable when the seat is rearward of a predetermined point.

BACKGROUND OF THE INVENTION

A typical prior art vehicle front seat is adjustable for the comfort of an occupant. Prior art front seats, however, are limited in their range of fore and aft movement, and therefore the number of useful front seat configurations is limited.

SUMMARY OF THE INVENTION

A vehicle is provided in which a front seat is adjustable fore/aft within the vehicle, and in which a lock-out feature renders the vehicle inoperable when the seat is located rearward of a predetermined point of travel. The lock-out feature is also preferably configured such that the front seat is prevented from traveling rearward of the predetermined point of travel when a predetermined vehicle condition exists. For example, the lock-out feature may prevent the front seat from traveling rearward of the predetermined point if the engine is running, if the ignition switch is in the on position, if the transmission selector is not in "Park" position, etc. A corresponding method is also provided. The method includes determining whether the vehicle seat is positioned rearward of the predetermined point, and rendering the vehicle inoperable in response to the vehicle seat being positioned rearward of the predetermined point. The method also preferably includes sensing the presence or existence of a predetermined vehicle condition, and preventing movement of the vehicle seat rearward of the predetermined point in response to the presence or existence of the predetermined condition.

The invention provides vehicle occupants with flexibility in seating configurations not achievable with the prior art. For example, a driver can park the vehicle, adjust the seat substantially rearward in the vehicle, and thereby have a substantial amount of room away from the dashboard and the steering wheel in which to rest or perform work. Similarly, a driver can reposition the seat rearward when parked to tend to a child or infant in a rear seat without having to leave the vehicle to access the rear seat.

The above features and advantages, and other features and advantages, of the present invention are readily apparent from the following detailed description of the best modes for carrying out the invention when taken in connection with the accompanying drawings.

BRIEF DESCRIPTION OF THE DRAWINGS

FIG. 1 is a partial cutaway side schematic view of a vehicle having a front seat in a forward driving position and a vehicle lock-out mechanism;

FIG. 2 is a schematic front view of the upper and lower rails of FIG. 1; and

DESCRIPTION OF THE PREFERRED EMBODIMENTS

Figure 3:
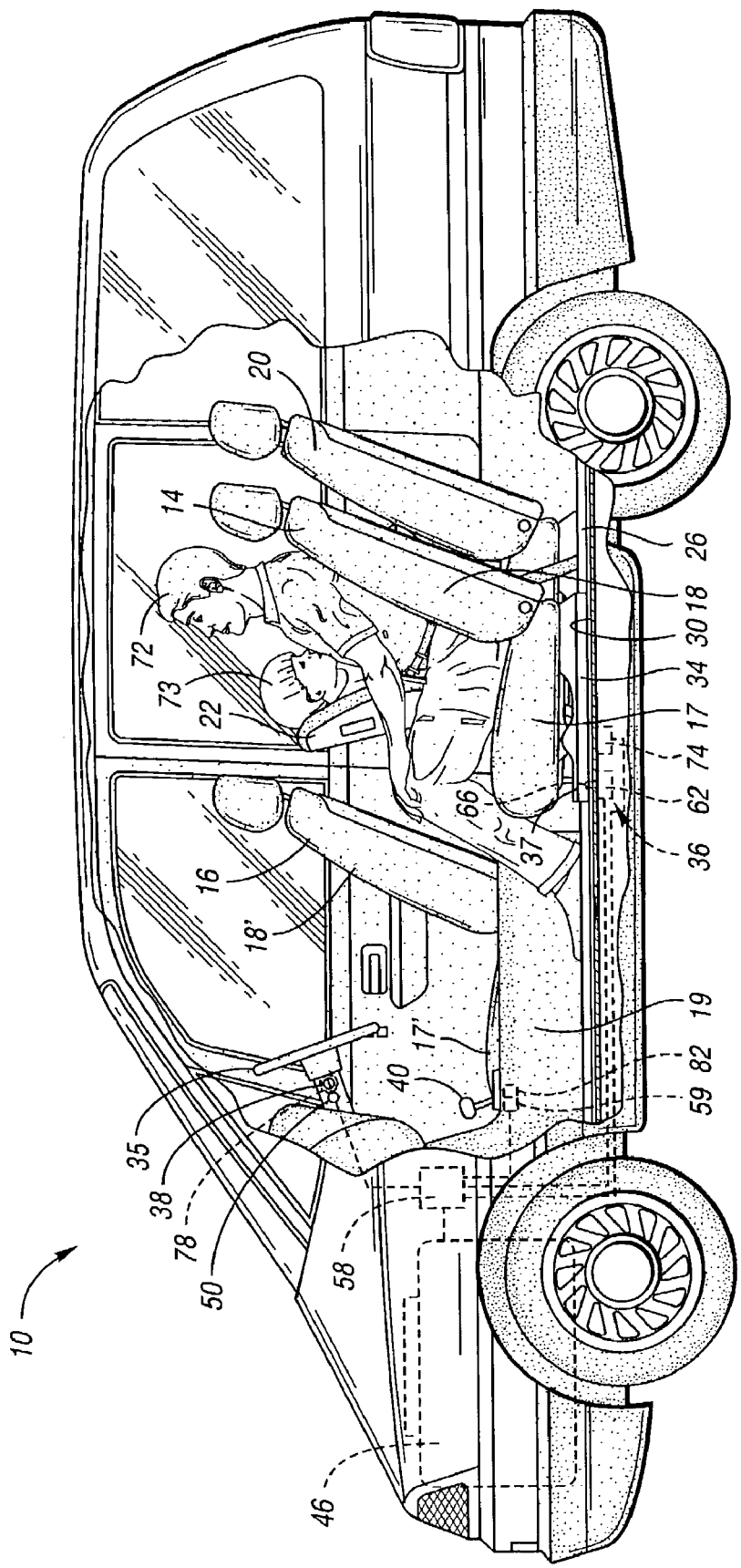
FIG. 3 is a partial cutaway side schematic view of the vehicle of FIG. 1 with the front seat in a rearward nondriving position.

Referring to FIG. 1, a vehicle 10 includes front row seats, namely a front driver seat 14 and a front passenger seat 16, each including a lower seat portion 17, 17' and a seatback portion 18, 18'. A console 19 separates the front driver seat 14 and the front passenger seat 16. The vehicle 10 also includes a rear seat 20 located more rearwardly in the vehicle than the front row seats and behind the front passenger seat 16. An infant seat 22 is fastened to the rear seat 20. A pair of parallel lower rails 26 is connected to the vehicle floor 30 to form a seat track. Upper rails 34 are connected to the driver seat 14 and are slideably engaged with the lower rails 26. Those skilled in the art will recognize and understand a variety of seat track configurations that may be employed within the scope of the claimed invention. Exemplary seat tracks and upper rails are described in U.S. Pat. No. 4,787,756, issued Nov. 29, 1988 to Pilarski; U.S. Pat. No. 5,280,987, issued Jan. 25, 1994 to Miller; and U.S. Pat. No. 5,407,166, issued Apr. 18, 1995 to Pilarski, each of which is hereby incorporated by reference in its entirety.

The driver seat 14 is adjustable fore/aft, i.e., forward and rearward within the vehicle, by sliding the upper rails 34 along the lower rails 26. The seat track may be manually operated, or a power drive mechanism may be employed to adjust the driver seat 14. A latch mechanism (not shown) locks the seat 14 relative to the lower rails 26 when the seat 14 is in a desired position. The driver seat 14 is depicted in a driving position in which the driver seat 14 is adjacent a steering wheel 35 and other controls such as foot pedals (not shown).

A lock-out system 36 is configured to prevent movement of the driver seat 14 rearward of a predetermined point 37 on the rails 26 when certain predetermined vehicle conditions exist. The vehicle 10 includes an ignition switch 38 and a transmission selector 40. The ignition switch 38 is switchable between an on position and off position. The transmission selector 40 is moveable between a park position and various transmission operation modes including reverse, neutral and drive. For the vehicle to be in an operational mode, the ignition switch 38 must be in the on position and the transmission selector 40 must be in a position other than park. The vehicle 10 also includes a power plant 46 which provides motive power to propel the vehicle 10.

A sensor 50 is sufficiently configured and positioned with respect to the ignition switch 38 to detect the position of the ignition switch 38. A sensor 59 is sufficiently configured and positioned with respect to the transmission selector 40 to detect the position of the transmission selector 40. The sensors 50, 59 are operatively connected to a controller 58 that is programmed to energize solenoids 62 when sensor 50 indicates that the ignition switch 38 is in the on position, or when sensor 59 indicates that the transmission selector 40 is in a position other than park. As depicted in FIG. 1, each energized solenoid 62 extends a pin 66 such that the pin 66 blocks the travel path of the upper rails 34 on the lower rails 26 at the predetermined point 37, thereby preventing movement of the seat 14 rearward of the predetermined point 37.

Referring to FIG. 2, wherein like reference numbers refer to like components from FIG. 1, the lower rails 26 define channels 70, or receptive cavities, in which a portion of the upper rails 34 are received and slidably engaged. Pins 66 extend through holes in the upper and lower segment of the lower rails 26 to restrict movement of the upper rails 34.

Referring to FIG. 3, the ignition switch 38 is in the off position and the transmission selector 40 is in the park position. Accordingly, the controller 58 has caused the solenoid 62 to retract the pins 66 so that the driver seat 14 is movable to a nondriving position rearward of the predetermined point 37. At least a portion of the driver seat 14 is rearward of a portion of the rear seat 20, enabling an occupant 72 of the driver seat 14 to tend to an occupant 73 of the infant seat 22.

The lock-out system 36 is also configured such that the vehicle 10 is inoperable by a driver when the front driver seat 14 is rearward of the predetermined point 37. A position sensor 74 is sufficiently configured and positioned with respect to the lower rails 26 to determine whether the driver seat 14 is positioned rearward of the predetermined point 37. For example, the sensor 74 may be configured to detect when the seat 14 is rearward of the predetermined point 37 and continuously transmit a signal indicative of the seat's presence when the seat is rearward of the predetermined point. Similarly, the sensor 74 may be configured to detect movement of the seat 14 as it passes the predetermined point and transmit a signal indicative of the seat's movement past the predetermined point. The position sensor 74 is operatively connected to the controller 58.

An ignition switch lock 78 is operatively connected to the ignition switch 38 and selectively locks the ignition switch 38 in the off position, thereby rendering the vehicle 10 inoperable. A transmission selector lock 82 is operatively connected to the transmission selector 40 and selectively locks the transmission selector 40 in the park position, thereby rendering the vehicle 10 inoperable. The controller 58 is operatively connected to the ignition switch lock 78 and the transmission selector lock 82 and is programmed to cause the ignition switch lock 78 and/or the transmission selector lock 82 to activate and thereby lock the ignition switch 38 or transmission selector 40 when the position sensor 74 indicates that the driver seat 14 is rearward of the predetermined point.

Thus, when the driver seat 14 is rearward of the predetermined point 37, the ignition switch 38 is locked in the off position and/or the transmission selector 40 is locked in the park position, thereby rendering the vehicle 10 inoperable. Alternatively, the controller 58 may be operatively connected to the powerplant 46 and programmed to disable the powerplant 46 when the driver seat 14 is rearward of the predetermined point 37.

In the context of the present invention, the "lock-out system" may or may not include substantially independent subsystems. For example, a lock-out system may include a first subsystem that is configured to detect the existence of a predetermined vehicle condition and prevent the seat from moving rearward of the predetermined point when the predetermined vehicle condition exists. The lock-out system may include a second subsystem that is configured to detect whether the seat is rearward of the predetermined point and render the vehicle inoperable when the seat is rearward of the predetermined point. The first subsystem and the second subsystem may or may not have components or elements in common with one another and may or may not operate substantially independently from one another.

While the best mode for carrying out the invention has been described in detail, those familiar with the art to which this invention relates will recognize various alternative designs and embodiments for practicing the invention within the scope of the appended claims.

What is claimed is:

1. A vehicle comprising:
    a seat having a lower seat portion and a seatback portion wherein the seat is selectively movable fore and aft within the vehicle; and
    a lock-out system sufficiently configured to render the vehicle inoperable when the lower seat portion is located rearward of a predetermined point.

2. The vehicle of claim 1, further comprising a transmission selector movable between a plurality of positions including a first position corresponding to a park transmission mode and a second position corresponding to a drivable transmission mode; and a transmission selector lock operatively connected to the transmission selector to selectively lock the transmission selector in the first position and thereby render the vehicle inoperable; wherein the lock-out system is configured such that the transmission selector lock locks the transmission selector in the first position when the lower seat portion is rearward of the predetermined point.

3. The vehicle of claim 1, further comprising an ignition switch switchable between an on position and an off position; and an ignition switch lock operatively connected to the ignition switch to selectively lock the ignition switch in the off position and thereby render the vehicle inoperable; wherein the lock-out system is configured such that the ignition switch lock locks the ignition switch in the off position when the seat is rearward of the predetermined point.

4. The vehicle of claim 1, wherein the vehicle includes a powerplant for supplying motive power to propel the vehicle, and a controller operatively connected to the powerplant and sufficiently configured to render the powerplant inoperable when the seat is rearward of the predetermined point.

5. The vehicle of claim 1, wherein the lock-out system is sufficiently configured to prevent movement of the lower seat portion rearward of the predetermined point when a predetermined vehicle condition exists.

6. The vehicle of claim 5, wherein the lock-out system includes a sensor configured to detect whether the predetermined vehicle condition exists.

7. The vehicle of claim 6, further comprising a transmission selector movable between a plurality of positions including a first position corresponding to a park transmission mode and a second position corresponding to a drivable transmission mode; wherein the sensor is sufficiently configured and positioned with respect to the transmission selector to detect whether the transmission selector is in the second position; and wherein the predetermined vehicle condition is the transmission selector being in the second position.

8. The vehicle of claim 6, further comprising an ignition switch switchable between an on position and an off position; wherein the sensor is sufficiently configured and positioned with respect to the ignition switch to detect whether the ignition switch is in the on position; and wherein the predetermined vehicle condition is the ignition switch being in the on position.

9. The vehicle of claim 5, wherein the seat is a front sear, and wherein the vehicle includes a rear seat rearward of the front seat; and wherein the front seat is selectively movable such that at least a portion of the front seat is rearward of at least a portion of the rear seat.

10. A method comprising:
- determining whether a lower seat portion of a vehicle seat is positioned rearward of a predetermined point, the vehicle seat being selectively movable fore and aft within a vehicle; and
- rendering the vehicle inoperable in response to the lower seat portion being positioned rearward of the predetermined point.

11. The method of claim 10, wherein the vehicle includes a transmission selector movable between a plurality of positions including a first position corresponding to a park transmission mode and a second position corresponding to a drivable transmission mode, and wherein said rendering the vehicle inoperable includes locking the transmission selector in the first position.

12. The method of claim 10, wherein the vehicle includes an ignition switch switchable between an on position and an off position, and wherein said rendering the vehicle inoperable includes locking the ignition switch in the off position.

13. The method of claim 10, wherein the method further comprises sensing the presence or existence of a predetermined vehicle condition; and preventing movement of the lower seat portion rearward of the predetermined point in response to the presence or existence of said predetermined condition.

14. The method of claim 13, wherein the vehicle includes a transmission selector movable between a plurality of positions including a first position corresponding to a park transmission mode and a second position corresponding to a drivable transmission mode; and wherein said predetermined condition is the transmission selector being in the second position.

15. The method of claim 13, wherein the vehicle includes an ignition switch switchable between an on position and an off position; and wherein said predetermined condition is the ignition switch being in the on position.

16. The method of claim 13, wherein the vehicle seat is operatively connected to a seat track on which the vehicle seat is movable fore and aft, and wherein said preventing the vehicle seat from moving rearward of the predetermined point includes obstructing movement of the vehicle seat along the seat track.

17. A vehicle comprising:
- a seat having a lower seat portion and a seatback portion wherein the seat is selectively movable fore and aft within the vehicle; and
- a lock-out system sufficiently configured to
  - render the vehicle inoperable when the lower seat portion is located rearward of a predetermined point, and
  - prevent movement of the lower sear portion rearward of the predetermined point when a predetermined vehicle condition exists.

* * * * *